(12) United States Patent
Xie et al.

(10) Patent No.: US 10,756,850 B2
(45) Date of Patent: Aug. 25, 2020

(54) COMMUNICATION METHOD, APPARATUS, AND SYSTEM

(71) Applicant: Huawei Technologies Co., Ltd., Shenzhen, Guangdong (CN)

(72) Inventors: Xinqian Xie, Beijing (CN); Zhiheng Guo, Beijing (CN); Xingqing Cheng, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/265,578

(22) Filed: Feb. 1, 2019

(65) Prior Publication Data

US 2019/0165892 A1 May 30, 2019

Related U.S. Application Data (63) Continuation of application No. PCT/CN2017/084570, filed on May 16, 2017.

(30) Foreign Application Priority Data

Aug. 5, 2016 (CN) .......................... 2016 1 0639731

(51) Int. Cl.
*H04W 72/04* (2009.01)
*H04L 1/16* (2006.01)
(Continued)

(52) U.S. Cl.
CPC .............. *H04L 1/1607* (2013.01); *H04L 1/12* (2013.01); *H04L 1/1664* (2013.01); *H04L 1/1671* (2013.01); *H04L 5/0055* (2013.01); *H04W 72/04* (2013.01); *H04W 72/042* (2013.01); *H04L 1/188* (2013.01); *H04W 88/02* (2013.01); *H04W 88/08* (2013.01)

(58) Field of Classification Search
CPC ... H04W 72/04; H04W 88/02; H04W 72/042; H04L 1/16; H04L 1/1607; H04L 5/0055
See application file for complete search history.

(56) References Cited

U.S. PATENT DOCUMENTS

2010/0098006 A1* 4/2010 Golitschek Edler Von Elbwart ................ H04L 1/1861 370/329
2010/0142461 A1 6/2010 Miki et al.
(Continued)

FOREIGN PATENT DOCUMENTS

| CN | 102025447 A | 4/2011 |
|---|---|---|
| CN | 102387596 A | 3/2012 |

(Continued)

*Primary Examiner* — Chi Ho A Lee
(74) *Attorney, Agent, or Firm* — Slater Matsil, LLP (57) ABSTRACT

The present disclosure discloses a communication method, an apparatus, and a system. The communication method includes: receiving, by a base station, uplink data sent by a terminal device; decoding the uplink data; and sending, by the base station, feedback information of the uplink data. The feedback information is used to indicate a decoding status of the uplink data, and carries information about an identifier. The identifier includes an identity of the terminal device or an identifier of the uplink data. In this way, the terminal device is prevented from receiving incorrect feedback information during conflicting transmission.

20 Claims, 5 Drawing Sheets

(51) Int. Cl.
  *H04L 1/12* (2006.01)
  *H04L 5/00* (2006.01)
  *H04L 1/18* (2006.01)
  *H04W 88/02* (2009.01)
  *H04W 88/08* (2009.01)

(56) References Cited

U.S. PATENT DOCUMENTS

| | | | | |
|---|---|---|---|---|
| 2010/0309929 A1* | 12/2010 | Gao | ............... | H04W 56/0005 |
| | | | | 370/458 |
| 2011/0243066 A1* | 10/2011 | Nayeb Nazar | ........ | H04L 5/0055 |
| | | | | 370/328 |
| 2012/0020321 A1 | 1/2012 | Higuchi et al. | | |
| 2013/0195079 A1 | 8/2013 | Xu et al. | | |
| 2013/0223297 A1 | 8/2013 | Zhang et al. | | |
| 2014/0177540 A1* | 6/2014 | Novak | ............. | H04W 72/0406 |
| | | | | 370/329 |
| 2015/0237649 A1* | 8/2015 | Zhang | ................. | H04W 72/121 |
| | | | | 370/329 |
| 2015/0289292 A1 | 10/2015 | Sun et al. | | |
| 2017/0165899 A1* | 6/2017 | Murray | ................. | B29C 59/022 |
| 2017/0237539 A1* | 8/2017 | Xu | ........................ | H04W 88/00 |
| | | | | 370/329 |
| 2017/0257902 A1 | 9/2017 | Xing et al. | | |
| 2017/0325177 A1* | 11/2017 | Liu | ..................... | H04W 52/143 |
| 2018/0019842 A1* | 1/2018 | Fu | ......................... | H04L 1/1854 |
| 2018/0310334 A1* | 10/2018 | Mukherjee | ............ | H04L 5/0053 |

FOREIGN PATENT DOCUMENTS

| | | |
|---|---|---|
| CN | 102932126 A | 2/2013 |
| CN | 105471553 A | 4/2016 |
| EP | 2456108 A2 | 5/2012 |
| EP | 2793410 A1 | 10/2014 |
| WO | 2008055222 A2 | 5/2008 |
| WO | 2011/097815 A1 | 8/2011 |
| WO | 2012/048568 A1 | 4/2012 |

* cited by examiner

COMMUNICATION METHOD, APPARATUS, AND SYSTEM

CROSS-REFERENCE TO RELATED APPLICATIONS

This application is a continuation of International Application No. PCT/CN2017/084570, filed on May 16, 2017, which claims priority to Chinese Patent Application No. 201610639731.X, filed on Aug. 5, 2016. The disclosures of the aforementioned applications are hereby incorporated by reference in their entireties.

TECHNICAL FIELD

The present application relates to the field of communications technologies, and in particular, to a communication method, an apparatus, and a system.

BACKGROUND

In the field of wireless communications, particularly in a cellular mobile communications network, uplink data transmission from a terminal device to a base station may be performed by using a contention-based uplink transmission mode. The terminal device selects an available uplink resource from a preallocated uplink resource pool, to transmit data to the base station. After receiving the uplink data sent by the terminal device, the base station needs to feed back acknowledgement information to the terminal device, to notify the terminal device whether the sent data is correctly received.

The base station determines, based on a location of the uplink resource used by the terminal device, a location of a downlink resource used for feeding back the acknowledgement information to the terminal device. When at least two the terminal devices simultaneously select a same uplink resource for transmission, in other words, there is a transmission conflict, the base station uses a same downlink resource to feed back the acknowledgement information. However, when the base station needs to feed back different acknowledgement information to terminal devices, use of a same downlink resource causes some of the terminal devices to receive incorrect acknowledgement information, resulting in a logic error.

SUMMARY

Embodiments of the present disclosure provide a communication method, an apparatus, and a system, to avoid a logic error in information feedback and caused by conflicting transmission.

According to an aspect, an embodiment of the present disclosure provides a communication method. The method includes: receiving, by a base station, uplink data sent by a terminal device; decoding, by the base station, the uplink data; and sending, by the base station, feedback information of the uplink data, where the feedback information is used to indicate a decoding status of the uplink data, the feedback information carries information about an identifier, and the identifier includes an identity of the terminal device or an identifier of the uplink data. According to the method provided in this embodiment, the base station adds the information about the identifier to the feedback information, so that it can be ensured that the terminal device receives correct feedback information, thereby avoiding a logic error in information feedback and caused by conflicting transmission.

In a possible design, that the feedback information carries information about an identifier includes: the feedback information is scrambled by using the identifier. Through indirect carrying, occupied transmission resources are reduced while accurate information feedback is ensured, thereby effectively reducing resource consumption. Alternatively, the feedback information includes the identifier. Through direct carrying, it can be ensured at a maximum degree that the terminal device receives correct feedback information.

In a possible design, the identifier and acknowledgement information are jointly encoded, or the identifier and the acknowledgement information are separately encoded.

In a possible design, the base station scrambles the acknowledgement information by using identity information of the terminal device or the identifier of the uplink data.

In a possible design, when the base station correctly decodes the uplink data, the feedback information includes an acknowledgement (ACK). The acknowledgement (ACK) is a field having at least one bit.

In a possible design, when the base station incorrectly decodes the uplink data, the feedback information includes a negative acknowledgement (NACK). The negative acknowledgement (NACK) is a field having at least one bit.

In a possible design, before the sending, by the base station, feedback information to the terminal device, the method further includes: determining, by the base station, that the uplink data is correctly or incorrectly decoded.

In a possible design, when the base station incorrectly decodes the uplink data, the base station does not send the feedback information of the uplink data. In this way, required signaling can be reduced while a logic error in information feedback is avoided, thereby saving system transmission resources.

In a possible design, the base station may jointly encode feedback information of different terminal devices or uplink data. Alternatively, the base station may separately encode the feedback information of the terminal devices or uplink data.

According to another aspect, an embodiment of the present disclosure provides a communication method. The method includes: sending, by a terminal device, uplink data to a base station; receiving, by the terminal device, feedback information of the uplink data, where the feedback information carries information about an identifier, and the identifier includes an identity of the terminal device or an identifier of the uplink data; and determining, by the terminal device based on the feedback information, a status of decoding of the uplink data performed by the base station. According to the method provided in this embodiment, the terminal device can determine, by receiving correct feedback information, the status of decoding of the uplink data performed by the base station, thereby avoiding a logic error in the feedback information and caused by conflicting transmission.

In a possible design, that the feedback information carries information about an identifier includes: the feedback information is scrambled by using the identifier. The determining, by the terminal device based on the feedback information, a status of decoding of the uplink data performed by the base station includes: descrambling, by the terminal device, the feedback information by using the identifier; and if the descrambled feedback information includes an acknowledgement (ACK), determining that the base station correctly decodes the uplink data; or if the descrambled feedback information includes a negative acknowledgement (NACK), determining that the base station incorrectly decodes the uplink data. Through indirect identifier carrying, occupied transmission resources are reduced while accurate information feedback is ensured, thereby effectively reducing resource consumption.

In a possible design, that the feedback information carries information about an identifier includes: the feedback information includes the identifier. The determining, by the terminal device based on the feedback information, a status of decoding of the uplink data performed by the base station includes: if the terminal device identifies the identifier, determining that the base station correctly or incorrectly decodes the uplink data; or if the terminal device identifies the identifier and the feedback information further includes an acknowledgement (ACK), determining that the base station correctly decodes the uplink data; or if the terminal device identifies the identifier and the feedback information further includes a negative acknowledgement (NACK), determining that the base station incorrectly decodes the uplink data. In a possible design, the feedback information includes a negative acknowledgement (NACK). Through direct identifier carrying, it can be ensured at a maximum degree that the terminal device receives correct feedback information.

According to still another aspect, an embodiment of the present disclosure provides a terminal device, including: a sending unit, configured to send uplink data to a base station; a receiving unit, configured to receive feedback information of the uplink data, where information about an identifier is carried, and the identifier includes an identity of the terminal device or an identifier of the uplink data; and a processing unit, configured to determine, based on the feedback information, a status of decoding of the uplink data performed by the base station.

In a possible design, that the feedback information carries information about an identifier includes: the feedback information is scrambled by using the identifier. That the processing unit is configured to determine, based on the feedback information, a status of decoding of the uplink data performed by the base station includes: descrambling, by the terminal device, the feedback information by using the identifier; and if the descrambled feedback information includes an acknowledgement (ACK), determining that the base station correctly decodes the uplink data; or if the descrambled feedback information includes a negative acknowledgement (NACK), determining that the base station incorrectly decodes the uplink data.

In a possible design, that the feedback information carries information about an identifier includes: the feedback information includes the identifier. That the processing unit is configured to determine, based on the feedback information, a status of decoding of the uplink data performed by the base station includes: if the processing unit identifies the identifier, determining that the base station correctly or incorrectly decodes the uplink data; or if the processing unit identifies the identifier and the feedback information further includes an acknowledgement (ACK), determining that the base station correctly decodes the uplink data; or if the processing unit identifies the identifier and the feedback information further includes a negative acknowledgement (NACK), determining that the base station incorrectly decodes the uplink data.

In a possible design, the terminal device may implement functions implemented by the terminal device in the foregoing method by using hardware. A structure of the terminal device may include a receiver, a transmitter, and a processor. The receiver and the transmitter may implement functions of the receiving unit and the sending unit. The processor may implement a function of the processing unit.

In a possible design, the terminal device may alternatively implement functions implemented by the terminal device in the foregoing method by using hardware executing corresponding software. The hardware or software includes one or more modules corresponding to the foregoing functions. The modules may be software and/or hardware.

According to still another aspect, an embodiment of the present disclosure provides a base station, including: a receiving unit, configured to receive uplink data sent by a terminal device; a processing unit, configured to decode the uplink data; and a sending unit, configured to send feedback information of the uplink data, where the feedback information is used to indicate a decoding status of the uplink data, the feedback information carries information about an identifier, and the identifier includes an identity of the terminal device or an identifier of the uplink data.

In a possible design, that the feedback information carries information about an identifier includes: the processing unit uses the identifier to scramble the feedback information, or the feedback information includes the identifier.

In a possible design, when the processing unit correctly decodes the uplink data, the feedback information includes an acknowledgement (ACK).

In a possible design, when the processing unit incorrectly decodes the uplink data, the feedback information includes a negative acknowledgement (NACK).

In a possible design, before the sending unit sends the feedback information of the uplink data, the processing unit is further configured to determine that the uplink data is correctly or incorrectly decoded.

In a possible design, when the processing unit incorrectly decodes the uplink data, the sending unit does not send the feedback information of the uplink data.

In a possible design, the base station may implement functions implemented by the base station in the foregoing method by using hardware. A structure of the base station may include a processor, a receiver, and a transmitter. The processor may implement the function of the processing unit. The receiver and the transmitter may implement the functions of the receiving unit and the sending unit.

In a possible design, the base station may alternatively implement functions implemented by the base station in the foregoing method by using hardware executing corresponding software. The hardware or software includes one or more modules corresponding to the foregoing functions. The modules may be software and/or hardware.

According to still another aspect, an embodiment of the present disclosure provides a communications system. The system includes the base station and the terminal device according to the foregoing aspects.

According to yet another aspect, an embodiment of the present disclosure provides a computer storage medium, configured to store a computer software instruction used by the foregoing terminal device. The computer software instruction includes a program designed for performing the foregoing aspects.

According to yet another aspect, an embodiment of the present disclosure provides a computer storage medium, configured to store a computer software instruction used by the foregoing base station. The computer software instruction includes a program designed for performing the foregoing aspects.

According to the technical solutions provided in the embodiments of the present disclosure, after receiving and decoding the uplink data sent by the terminal device, the base station sends the feedback information of the uplink data. The feedback information carries the information about the identifier, so that the terminal device can correctly receive the feedback information, thereby avoiding a logic error in information feedback and caused by conflicting transmission.

BRIEF DESCRIPTION OF DRAWINGS

To describe technical solutions in embodiments of the present disclosure more clearly, the following briefly describes the accompanying drawings required for describing the embodiments. Apparently, the accompanying drawings in the following description merely show some embodiments of the present disclosure, and a person of ordinary skill in the art can derive other accompanying drawings from these accompanying drawings within a proper scope.

DESCRIPTION OF EMBODIMENTS

The technical solutions according to the embodiments of the present disclosure are clearly described in the following with reference to the accompanying drawings. Apparently, the described embodiments are merely some but not all of the embodiments of the present disclosure. It may be understood that other embodiments obtained by a person of ordinary skill in the art by combining the technical features in or between the embodiments without generating any ambiguity or contradiction also fall within the protection scope of the present disclosure.

Figure 1:
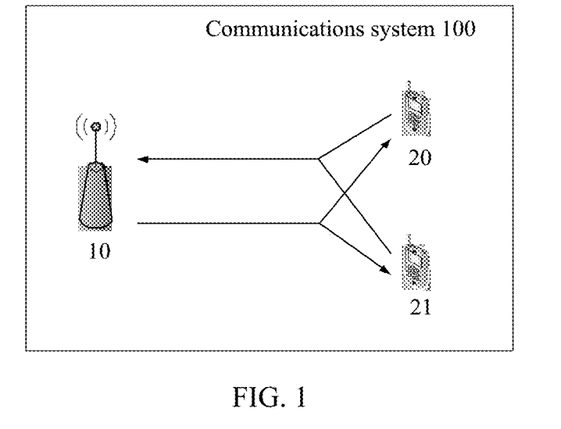
FIG. 1 is a schematic diagram of a communications system according an embodiment of the present disclosure.

The technical solutions provided in the embodiments of the present disclosure are based on a communications system 100 shown in FIG. 1. The communications system 100 may support an uplink contention transmission mode. The communications system 100 includes at least one base station (BS) and at least two terminal devices. In the uplink contention transmission mode, the base station allocates an uplink resource pool to the terminal device in a quasi-static manner. The uplink resource pool includes several uplink resources, and a plurality of terminal devices share resources in the uplink resource pool. When any terminal device needs to transmit uplink data, the terminal device may select an available uplink resource from the uplink resource pool, and transmit data to the base station by using the uplink resource. After receiving the uplink data sent by the terminal device, the base station determines, based on a location of the uplink resource used by the terminal device to transmit the data, a location of a downlink resource used for sending feedback information to the terminal device, to send the feedback information to the terminal device by using the determined downlink resource. The base station notifies, by using the feedback information, the terminal device whether the sent data is correctly received. The feedback information may include, for example, an acknowledgement (ACK) or a negative acknowledgement (NACK).

The communications system 100 shown in FIG. 1 includes, for example, two terminal devices that use the uplink contention transmission mode. The two terminal devices are a terminal device 20 and a terminal device 21. A base station 10 determines, based on a location of an uplink resource used by the terminal devices 20 and 21 to transmit data, a location of a downlink resource allocated to feedback information to be sent to the terminal devices 20 and 21. When the terminal devices 20 and 21 use a same uplink resource to transmit data, in other words, when transmission conflicts, the base station 10 can correctly decode uplink data that is sent by the terminal devices 20 and 21 and that interferes with each other, and use a same downlink resource to send feedback information to the terminal devices 20 and 21.

It should be understood that, in the embodiments of the present disclosure, the communions system 100 may be a Global System for Mobile Communications (GSM), a Code Division Multiple Access (CDMA) system, a Wideband Code Division Multiple Access (WCDMA) system, a general packet radio service (GPRS), a Long Term Evolution (LTE) system, an LTE frequency division duplex (FDD) system, an LTE time division duplex (TDD) system, a Universal Mobile Telecommunications System (UMTS), another wireless communications system to which an orthogonal frequency division multiplexing (OFDM) technology is applied, or the like. In addition, the communications system 100 may further be applied to future-oriented communications technologies, and communications systems that use new communications technologies are all applicable to the technical solutions provided in the embodiments of the present disclosure, provided that the communications systems support uplink contention transmission. System architectures and service scenarios described in the embodiments of the present disclosure aim to more clearly describe the technical solutions in the embodiments of the present disclosure, but are not intended to limit the technical solutions provided in the embodiments of the present disclosure. A person of ordinary skill in the art may know that as network architectures evolve and a new service scenario emerges, the technical solutions provided in the embodiments of the present disclosure are further applicable to a similar technical problem.

It should also be understood that in the embodiments of the present disclosure, the terminal device may be referred to as user equipment (UE), a mobile station (MS), a mobile terminal, or the like. The terminal device may communicate with one or more core networks by using a radio access network (RAN). For example, the terminal device may be a mobile phone (or referred to as a "cellular" phone) or a computer with a mobile terminal. For example, the terminal device may be a portable, pocket-sized, handheld, computer built-in, or in-vehicle mobile apparatus, which exchanges voice and/or data with the radio access network.

In the embodiments of the present disclosure, the base station 10 may be a base transceiver station (BTS) in GSM or CDMA, or may be a NodeB in WCDMA, or may be an evolved NodeB (eNB, or e-NodeB) in LTE. The base station and the terminal device are not specifically defined in the embodiments of the present disclosure.

It should be noted that the quantity of the terminal devices included in the communications system 100 shown in FIG. 1 is merely an example, and the embodiments of the present disclosure are not limited thereto. For example, more terminal devices communicating with the base station may be included, and for ease of description, no further details are provided herein. In addition, although the base station 10 and the terminal devices 20 and 21 are shown in the communications system 100 shown in FIG. 1, the communications system 100 may include, but is not limited to, the base station and the terminal devices. For example, the communications system 100 may further include a core network device or a device for carrying a virtualized network function. These are apparent to a person of ordinary skill in the art, and are not described in detail herein.

In a case of conflicting transmission, for example, when uplink data of two terminal devices is correctly or incorrectly decoded, the base station may use a same downlink resource to send feedback information. However, when data of one terminal device is correctly decoded while data of the other terminal device is incorrectly decoded, the base station needs to use a same downlink resource to send different feedback information, for example, an ACK and a NACK, to the two terminal devices. However, one terminal device receives incorrect acknowledgement information regardless of whether the base station feeds back the ACK or the NACK by using the same downlink resource, resulting in a logic error.

In the solutions of the embodiments of the present disclosure, the base station receives and decodes the uplink data sent by the terminal device. The base station sends the feedback information of the uplink data based on a decoding status of the uplink data. The feedback information carries information about an identifier. The identifier includes an identity of the terminal device or an identifier of the uplink data. In this way, according to the method provided in the embodiments of the present disclosure, when conflicting transmission exists in a plurality of terminal devices, each terminal device can obtain correct feedback information based on the information about the identifier, thereby effectively avoiding a logic error in information feedback and caused by the conflicting transmission.

It should be noted that in the embodiments of the present disclosure, both the uplink resource and the downlink resource that are used for sending data between the base station and the terminal device are time-frequency resources.

Figure 2:
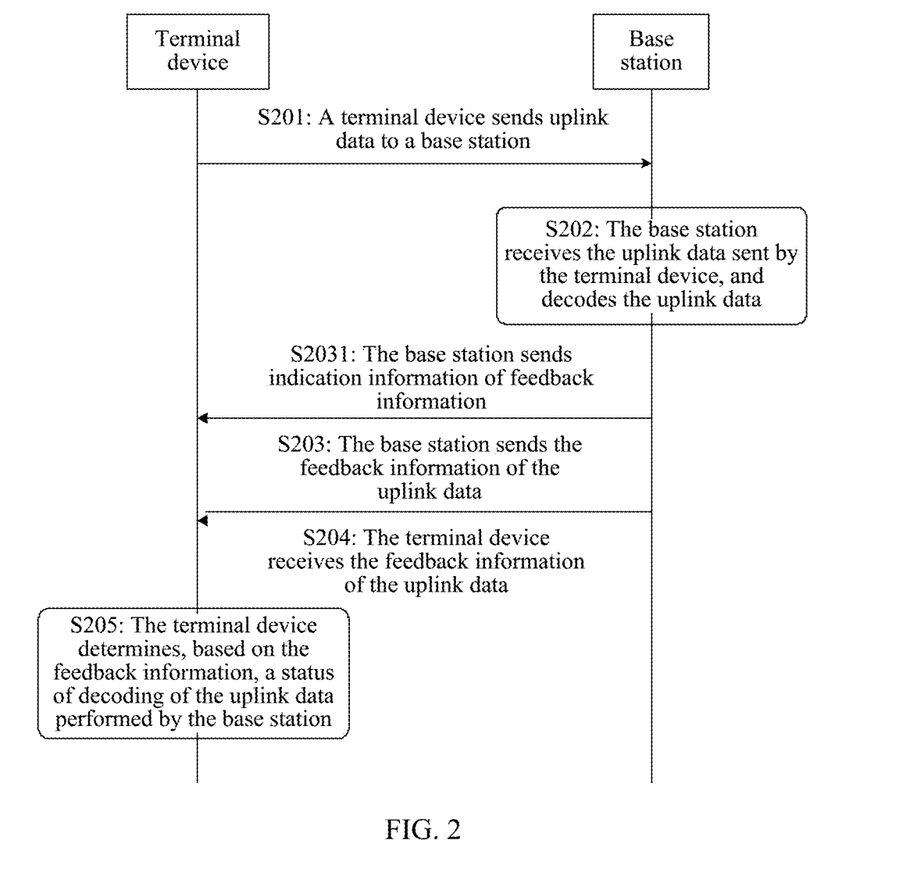
FIG. 2 is a schematic diagram of a communication method according to another embodiment of the present disclosure.

FIG. 2 is a schematic diagram of a communication method according to an embodiment of the present disclosure. The method provided in this embodiment is described below in detail with reference to FIG. 2.

S201. A terminal device sends uplink data to a base station.

The terminal device sends the uplink data to the base station by using an uplink resource selected from an uplink resource pool.

Optionally, when there are a plurality of terminal devices, the plurality of terminal devices may use different uplink resources to send uplink data to the base station, or may use a same uplink resource to send uplink data to the base station.

S202. The base station receives the uplink data sent by the terminal device, and decodes the uplink data.

After receiving uplink data sent by the terminal device, the base station decodes the uplink data, to obtain information carried in the uplink data.

S203. The base station sends feedback information of the uplink data.

The feedback information is used to indicate a decoding status of the uplink data, and carries information about an identifier. The identifier includes an identity of the terminal device or an identifier of the uplink data.

The base station may identify the identity of the terminal device that sends the uplink data, and add information about the identity of the terminal device to the feedback information, so that the terminal device can determine the feedback information by using the information about the identity of the terminal device, thereby avoiding a logic error in receiving the feedback information caused by conflicting transmission.

The base station may alternatively identify the identifier of the uplink data, and add information about the identifier of the uplink data to the feedback information, so that the terminal device can also obtain correct feedback information by identifying the information about the identifier of the uplink data.

In this embodiment, the base station determines, based on the decoding status of the uplink data and after receiving the uplink data sent by the terminal device, the feedback information that needs to be sent, and allocates a downlink resource to the feedback information.

Optionally, when the base station receives uplink data sent by at least one terminal device, the base station allocates a downlink resource to feedback information of the uplink data of the terminal device. When the base station does not receive the uplink data of the terminal device, the base station allocates no downlink resource if the base station does not need to transmit the feedback information of the uplink data.

The base station may alternatively determine, based on the decoding status of the uplink data, the downlink resource for sending the feedback information of the uplink data. Specifically, when the base station correctly decodes at least one piece of uplink data, the base station allocates a downlink resource to the feedback information of the uplink data. When the base station incorrectly decodes all received uplink data, the base station does not allocate any downlink resource to the feedback information of the uplink data.

Optionally, when a plurality of terminal devices use a same uplink resource to send uplink data to the base station, the base station allocates a same downlink resource to feedback information of the uplink data.

The information about the identifier may be directly carried in the feedback information, or may be indirectly carried in the feedback information. Different possible implementations are specifically described below.

In a possible implementation, the base station directly adds the information about the identifier to the feedback information. In other words, the feedback information includes the identity of the terminal device or the identifier of the uplink data.

The identity of the terminal device may be an existing field, for example, an international mobile subscriber identity (IMSI), in an existing system. The identity may be used to identify a mobile terminal device worldwide. Alternatively, the identity of the terminal device may be a newly defined field, used to uniquely identify the terminal device.

The identifier of the uplink data may be an existing identifier, for example, a cyclic shift identifier of an uplink demodulation reference signal (DM-RS), in the existing system. Alternatively, the identifier of the uplink data may be a newly defined identifier, used to identify the uplink data.

Optionally, the feedback information further includes acknowledgement information. The acknowledgement information may be a field having at least one bit. For example, when the acknowledgement information is a field having one bit, an acknowledgement (ACK) may be identified by "0", and a negative acknowledgement (NACK) may be identified by "1".

The base station may send the feedback information in an explicit manner. For example, when the base station receives and correctly decodes the uplink data, the feedback information includes an acknowledgement (ACK) and the identity of the terminal device, or includes the acknowledgement (ACK) and the identifier of the uplink data. When the base station receives but incorrectly decodes the uplink data, the feedback information includes a negative acknowledgement (NACK) and the identity of the terminal device, or includes the negative acknowledgement (NACK) and the identifier of the uplink data. In this way, the base station can enable, by using the identity of the terminal device or the identifier of the uplink data included in the feedback information, the terminal device to identify acknowledgement information corresponding to the uplink data sent by the terminal device, thereby avoiding a logic error in information feedback and caused by conflicting transmission.

The base station may alternatively send the feedback information in a semi-explicit manner. When the base station receives and correctly decodes the uplink data, the feedback information includes an acknowledgement (ACK) and the identity of the terminal device, or the feedback information includes the acknowledgement (ACK) and the identifier of the uplink data. When the base station receives but incorrectly decodes the uplink data, the feedback information includes only the identity of the terminal device or the identifier of the uplink data. In this way, a logic error in information feedback and caused by conflicting transmission can be avoided, and system transmission resources are saved.

The base station may transmit an encoded information block of the feedback information on a downlink control channel or a downlink data channel. For example, the feedback information may be transmitted on a physical downlink shared channel (PDSCH).

Figure 3A:
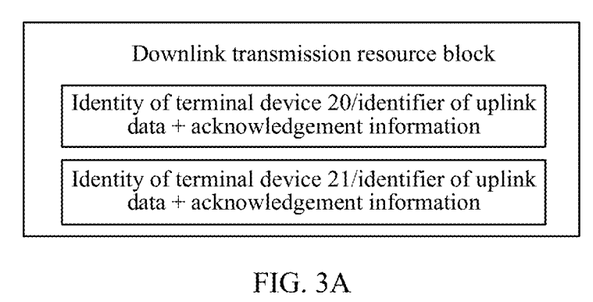
FIG. 3A is a schematic diagram of encoding feedback information according to an embodiment of the present disclosure.

Optionally, the base station jointly encodes the identity of the terminal device and the acknowledgement information (the acknowledgement information or the negative acknowledgement information), or the identifier of the uplink data and the acknowledgement information. For example, as shown in FIG. 3A, an identity of the terminal device 20 and the acknowledgement information are encoded as an information block, and an identity of the terminal device 21 and the acknowledgement information are encoded as another information block, for transmission on a downlink transmission resource block. Alternatively, the identifier of the uplink data sent by the terminal device 20 and the acknowledgement information are encoded as an information block, and the identifier of the uplink data sent by the terminal device 21 and the acknowledgement information are encoded as another information block, for transmission on a downlink transmission resource block.

Figure 3B:
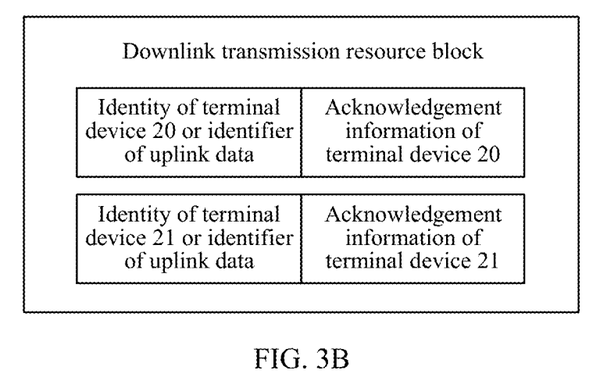
FIG. 3B is a schematic diagram of encoding feedback information according to another embodiment of the present disclosure.

Optionally, the base station separately encodes the identity of the terminal device and the acknowledgement information, or the identifier of the uplink data and the acknowledgement information. For example, as shown in FIG. 3B, the identity of the terminal device 20 or the identifier of the uplink data and the acknowledgement information are encoded as different information blocks, and the identity of the terminal device 21 or the identifier of the uplink data and the acknowledgement information are also encoded as different information blocks, for transmission on a downlink transmission resource block. In an encoding manner shown in FIG. 3B, the base station may use a same modulation method to modulate an encoded bit of the identity of the terminal device or the identifier of the uplink data and an encoded bit of the acknowledgement information, or may use different modulation methods to modulate the encoded bit of the identity of the terminal device or the identifier of the uplink data and the encoded bit of the acknowledgement information.

Figure 4A:
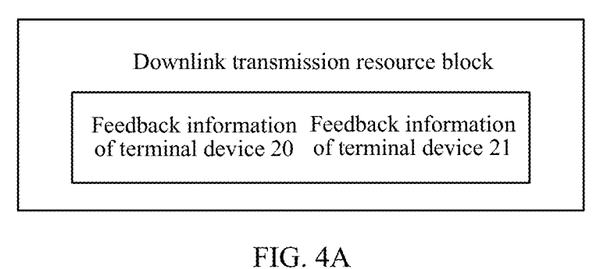
FIG. 4A is a schematic diagram of encoding feedback information according to another embodiment of the present disclosure.

Optionally, the base station jointly encodes feedback information of different terminal devices. For example, as shown in FIG. 4A, the feedback information of the terminal device 20 and the terminal device 21 are encoded as one information block for transmission.

Figure 4B:
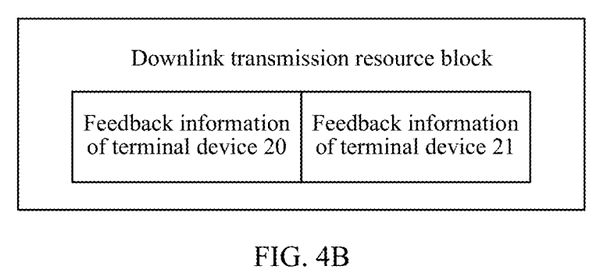
FIG. 4B is a schematic diagram of encoding feedback information according to another embodiment of the present disclosure.

Optionally, the base station separately encodes the feedback information of the terminal devices. For example, as shown in FIG. 4B, the feedback information of the terminal device 20 and the terminal device 21 are encoded as different information blocks for transmission.

In another possible implementation, the base station indirectly adds the information about the identifier to the feedback information.

The base station may send the feedback information in an explicit manner. When the base station receives and correctly decodes the uplink data, the feedback information includes an acknowledgement. The base station first encodes the acknowledgement, and subsequently scrambles the encoded acknowledgement by using the identity of the terminal device or the identifier of an uplink data as a scrambling code. When the base station receives but incorrectly decodes the uplink data, the feedback information includes a negative acknowledgement. The base station first encodes the negative acknowledgement, and subsequently scrambles the encoded negative acknowledgement by using the identity of the terminal device or the identifier of the uplink data as a scrambling code.

Optionally, when the base station receives and correctly decodes the uplink data, the feedback information includes an acknowledgement. The base station first encodes the acknowledgement, and subsequently determines, based on the identity of the terminal device or the identifier of the uplink data according to a predefined rule, a location of a resource for transmitting the acknowledgement, and transmits the encoded acknowledgement at the determined resource location. When the base station receives but incorrectly decodes the uplink data, the feedback information includes a negative acknowledgement. The base station first encodes the negative acknowledgement, and subsequently determines, based on the identity of the terminal device or the identifier of the uplink data according to a predefined rule, a location of a resource for transmitting the negative acknowledgement, and transmits the encoded negative acknowledgement at the determined resource location.

The base station may alternatively send the feedback information in a semi-explicit manner. When the base station receives and correctly decodes the uplink data, the feedback information includes an acknowledgement. The base station first encodes the acknowledgement, and subsequently scrambles the encoded acknowledgement by using the identity of the terminal device or the identifier of an uplink data as a scrambling code. When the base station receives but incorrectly decodes the uplink data, the feedback information is not sent.

Optionally, when the base station receives and correctly decodes the uplink data, the feedback information includes an acknowledgement. The base station first encodes the acknowledgement, and subsequently determines, based on the identity of the terminal device or the identifier of the uplink data according to a predefined rule, a location of a resource for transmitting the acknowledgement, and transmits the encoded acknowledgement at the determined resource location. When the base station receives but incorrectly decodes the uplink data, the feedback information is not sent.

In this implementation, the information about the identifier is indirectly added to the feedback information, so that system resources occupied for transmitting the feedback information can be reduced while it is ensured that the feedback information is correctly received, thereby effectively reducing resource consumption.

Optionally, before step S203 in this embodiment, the method further includes step S2031: The base station sends indication information of the feedback information.

Correspondingly, the terminal device receives the indication information of the feedback information.

In S2031, the base station sends the indication information of the feedback information to all terminal devices in a cell that are in a contention transmission mode, so that the terminal devices can receive the feedback information based on the indication information that is of the feedback information and that is sent in advance. The base station may notify the terminal device of the indication information by using broadcast signaling, Radio Resource Control (RRC) signaling, Media Access Control (MAC) layer signaling, or physical layer signaling. The notification manner of the base station for the terminal device may be semi-static or may be dynamic.

Optionally, the indication information of the feedback information is carried in downlink control information (DCI) and is sent from the base station to the terminal device. The DCI may be transmitted on a physical downlink control channel (PDCCH). The indication information of the feedback information may be sent to the terminal device by the base station by using broadcast signaling, RRC signaling, MAC layer signaling, or another physical layer signaling.

The indication information of the feedback information may include indication information of an encoding and modulation scheme of the feedback information, and may further include indication information of the downlink resource that is allocated to the feedback information by the base station.

Optionally, to enable the terminal device to identify whether the DCI carries the indication information of the feedback information, the base station may scramble a cyclic redundancy check (CRC) of the PDCCH by using a particular identifier. The identifier may be a newly defined radio network temporary identifier used for indicating the feedback information of the uplink data of the terminal device, or may be an existing identifier in an existing LTE system. The base station notifies in advance, by using the broadcast signaling, the RRC signaling, the MAC layer signaling, or the physical layer signaling, the identifier or indication information of the identifier to all terminal devices in the cell that are in the contention transmission mode.

Correspondingly, the terminal device receives the PDCCH based on configuration information of the indication information that is sent in advance by the base station. When the terminal device has sent the uplink data to the base station and does not receive the feedback information of the base station, the terminal device determines whether the received PDCCH carries the indication information of the feedback information. For example, the terminal device may perform determining based on scrambling code information of the CRC of the PDCCH. When the terminal device determines that the scrambling code information of the CRC of the PDCCH indicates that the PDCCH carries the indication information of the feedback information, the terminal device decodes the PDCCH, to obtain corresponding DCI. When the terminal device does not send the uplink data to the base station, the terminal device does not perform the determining operation.

S204. The terminal device receives the feedback information of the uplink data.

The feedback information carries information about an identifier, and the identifier includes an identity of the terminal device or an identifier of the uplink data.

Optionally, the terminal device may determine, based on the obtained indication information of the feedback information, a location of the downlink resource for sending the feedback information, and an encoding and modulation scheme of the feedback information. Subsequently, the terminal device receives the feedback information at the location of the downlink resource, and demodulates and decodes the feedback information based on the encoding and modulation scheme.

S205: The terminal device determines, based on the feedback information, a status of decoding of the uplink data performed by the base station.

Optionally, when successfully obtaining the information about the identifier, the terminal device further obtains acknowledgement information of the uplink data. If failing to obtain the information about the identifier, the terminal device does not perform the subsequent operation of obtaining the acknowledgement information.

In a possible implementation, corresponding to step S203, the feedback information directly carries the information about the identifier. In other words, the feedback information includes the identity of the terminal device or the identifier of the uplink data.

Optionally, the feedback information further includes acknowledgement information.

The terminal device may determine, by using explicit feedback information, the status of decoding of the uplink data performed by the base station. For example, when the feedback information includes an acknowledgement (ACK) and the identity of the terminal device, or includes the acknowledgement (ACK) and the identifier of the uplink data, the terminal device determines that the base station receives and correctly decodes the uplink data. When the feedback information includes a negative acknowledgement (NACK) and the identity of the terminal device, or includes the negative acknowledgement (NACK) and the identifier of the uplink data, the terminal device determines that the base station receives but incorrectly decodes the uplink data.

The terminal device may alternatively determine, by using semi-explicit feedback information, the status of decoding of the uplink data performed by the base station. For example, when the feedback information includes an acknowledgement (ACK) and the identity of the terminal device, or includes the acknowledgement (ACK) and the identifier of the uplink data, the terminal device determines that the base station receives and correctly decodes the uplink data. When the feedback information includes only the identity of the terminal device or the identifier of the uplink data, the terminal device determines that the base station receives but incorrectly decodes the uplink data.

In another possible implementation, corresponding to step S203, the feedback information indirectly carries the information about the identifier.

Optionally, the feedback information includes an acknowledgement or a negative acknowledgement. The terminal device may descramble the feedback information by using the identity of the terminal device or the identifier of the uplink data, to obtain acknowledgement information associated with the sent uplink data.

Optionally, the terminal device may determine, based on the identity of the terminal device or the identifier of the uplink data according to a predefined rule, a location of a resource for receiving the acknowledgement information, and receives the acknowledgement information at the determined resource location.

According to the communication method provided in this embodiment, the terminal device can be enabled to receive correct feedback information of the uplink data, thereby effectively avoiding a logic error in information feedback and caused by conflicting transmission.

Figure 5:
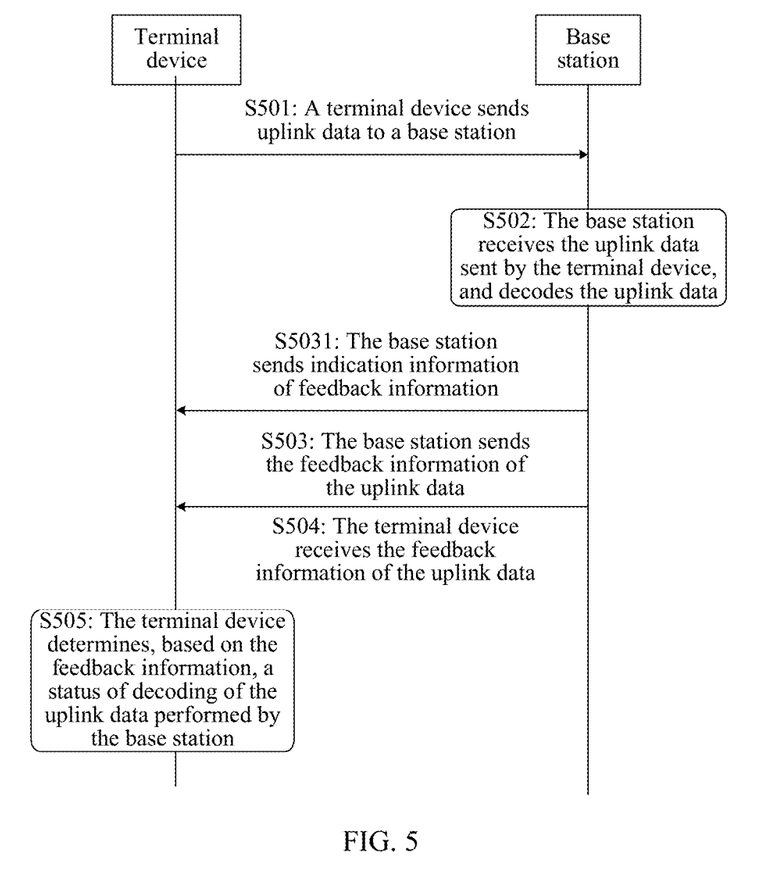
FIG. 5 is a schematic diagram of a communication method according to another embodiment of the present disclosure.

FIG. 5 is a schematic diagram of a communication method according to another embodiment of the present disclosure. The method provided in this embodiment is described below in detail with reference to FIG. 5.

S501. A terminal device sends uplink data to a base station.

S502. The base station receives the uplink data sent by the terminal device, and decodes the uplink data.

Step S501 and step S502 are the same as step S201 and step S202 in the embodiment shown in FIG. 2, and details are not described herein again.

S503. The base station sends feedback information of the uplink data.

Specifically, the base station sends the feedback information of the uplink data when determining that the uplink data is correctly decoded. The base station does not send the feedback information when determining that the uplink data is incorrectly decoded.

The feedback information is used to indicate a decoding status of the uplink data, and carries information about an identifier. The identifier includes an identity of the terminal device or an identifier of the uplink data.

Optionally, the base station directly adds the information about the identifier to the feedback information. In other words, the feedback information includes the identity of the terminal device or the identifier of the uplink data.

The base station may send the feedback information in an implicit manner. When the base station receives and correctly decodes the uplink data, the feedback information includes the identity of the terminal device or the identifier of the uplink data. When the base station receives but incorrectly decodes the uplink data, the base station does not send the feedback information. In this way, a logic error in information feedback and caused by conflicting transmission can be avoided while fewer downlink resources are occupied.

Optionally, before step 503, the method may further include step S031: The base station sends indication information of the feedback information to the terminal device.

S504. The terminal device receives the feedback information of the uplink data.

The feedback information carries the information about the identifier, and the identifier includes the identity of the terminal device or the identifier of the uplink data.

S505: The terminal device determines, based on the feedback information, a status of decoding of the uplink data performed by the base station.

Optionally, when the terminal device successfully obtains the information about the identifier, in other words, the terminal device successfully obtains the identifier of the terminal device or the identifier of the uplink data, the terminal device determines that the base station receives and correctly decodes the uplink data.

In this embodiment, the manner used by the base station to allocate a downlink resource to the feedback information, the manner of sending the indication information of the feedback information, and the manner used by the terminal device to receive the indication information are the same as corresponding steps in the embodiment shown in FIG. 2, and details are not described herein again.

According to the communication method provided in this embodiment of the present disclosure, the terminal device can be enabled to receive correct feedback information of the uplink data, thereby effectively avoiding a logic error in information feedback and caused by conflicting transmission.

The communication method provided in this embodiment of the present disclosure is described above mainly from the perspective of interactions between network elements. It may be understood that, to implement the foregoing functions, each network element, for example, the terminal device, an access network device, or a core network device includes corresponding hardware structures and/or software modules for performing the functions. A person of ordinary skill in the art should be easily aware that, the units and algorithm steps in the examples described with reference to the embodiments disclosed in this specification can be implemented by hardware or a combination of hardware and computer software in the present disclosure. Whether a function is performed by hardware or computer software driving hardware depends on particular applications and design constraint conditions of the technical solutions. A person skilled in the art may use different methods to implement the described functions for each particular application, but it should not be considered that the implementation goes beyond the scope of the present disclosure.

Figure 6:
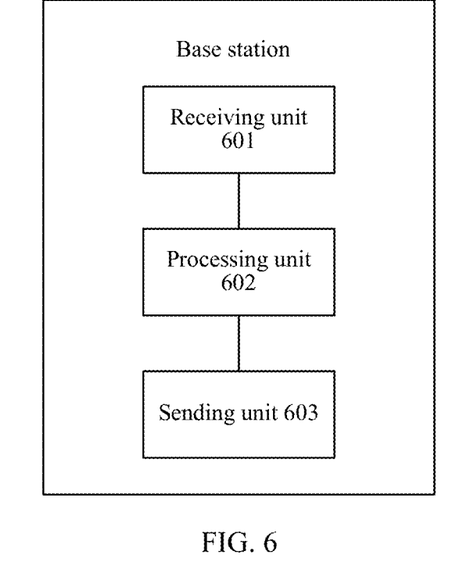
FIG. 6 is a possible schematic structural diagram of a base station according to an embodiment of the present disclosure.

FIG. 6 is a possible schematic structural diagram of the base station in the foregoing embodiments. The base station may be the base station 10 shown in FIG. 1. The base station includes a receiving unit 601, a processing unit 602, and a sending unit 603.

The receiving unit 601 is configured to receive uplink data sent by a terminal device.

The processing unit 602 is configured to decode the uplink data.

The sending unit 603 is configured to send feedback information of the uplink data. The feedback information is used to indicate a decoding status of the uplink data, and the feedback information carries information about an identifier.

The identifier includes an identity of the terminal device or an identifier of the uplink data.

Optionally, as described in the embodiments of FIG. 2 and FIG. 5, the information about the identifier may be directly or indirectly carried in the feedback information. The feedback information may further include acknowledgement information.

The processing unit 602 may further be configured to encode and modulate the feedback information. The processing unit 602 may jointly encode the identity of the terminal device and the acknowledgement information, or the identifier of the uplink data and the acknowledgement information. Alternatively, the processing unit 602 may separately encode the identity of the terminal device and the acknowledgement information, or the identifier of the uplink data and the acknowledgement information. When encoding is separately performed, the processing unit 602 may use a same modulation method to modulate an encoded bit of the identity of the terminal device or the identifier of the uplink data and an encoded bit of the acknowledgement information, or may use different modulation methods to modulate the encoded bit of the identity of the terminal device or the identifier of the uplink data and the encoded bit of the acknowledgement information. The processing unit 602 may jointly encode feedback information of different terminal devices, or may separately encode the feedback information of the terminal devices.

The processing unit 602 may further be configured to scramble the acknowledgement information. The processing unit 602 may scramble the encoded acknowledgement information by using the identity of the terminal device or the identifier of the uplink data as a scrambling code.

Optionally, the processing unit 602 may further be configured to determine, based on the identity of the terminal device or the identifier of the uplink data according to a predefined rule, a location of a resource for transmitting the acknowledgement information.

Optionally, as described in the embodiments of FIG. 2 and FIG. 5, the processing unit 602 may further be configured to determine the feedback information based on the decoding status of the uplink data.

In a possible implementation, the processing unit 602 directly adds the information about the identifier to the feedback information.

As described in the embodiment of FIG. 2, the sending unit 603 may send explicit feedback information determined by the processing unit 602. When the processing unit 602 correctly decodes the uplink data, the sending unit 603 sends the identity of the terminal device and an acknowledgement (ACK), or sends the identifier of the uplink data and the acknowledgement (ACK). When the processing unit 602 incorrectly decodes the uplink data, the sending unit 603 sends the identity of the terminal device and a negative acknowledgement (NACK), or sends the identifier of the uplink data and the negative acknowledgement (NACK).

As described in the embodiment of FIG. 2, the sending unit 603 may alternatively send semi-explicit feedback information determined by the processing unit 602. When the processing unit 602 correctly decodes the uplink data, the sending unit 603 sends the identity of the terminal device and an acknowledgement (ACK), or sends the identifier of the uplink data and the acknowledgement (ACK). When the processing unit 602 incorrectly decodes the uplink data, the sending unit 603 sends the identity of the terminal device or the identifier of the uplink data. In this way, a logic error in information feedback and caused by conflicting transmission can be avoided, and system transmission resources are saved.

As described in the embodiment of FIG. 5, the sending unit 603 may alternatively send implicit feedback information determined by the processing unit 602. When the processing unit 602 correctly decodes the uplink data, the sending unit 603 sends the identity of the terminal device or the identifier of the uplink data. When the processing unit 602 incorrectly decodes the uplink data, the sending unit 603 does not send the feedback information. In this way, a logic error in information feedback and caused by conflicting transmission can be avoided while fewer downlink resources are occupied.

In another possible implementation, the processing unit 602 indirectly adds the information about the identifier to the feedback information.

As described in the embodiment of FIG. 2, the sending unit 603 may alternatively send explicit feedback information determined by the processing unit 602. When the processing unit 602 correctly decodes the uplink data, the feedback information includes an acknowledgement. The processing unit 602 first encodes the acknowledgement, and subsequently scrambles the encoded acknowledgement by using the identity of the terminal device or the identifier of an uplink data as a scrambling code. When the processing unit 602 incorrectly decodes the uplink data, the feedback information includes a negative acknowledgement. The processing unit 602 first encodes the negative acknowledgement, and subsequently scrambles the encoded negative acknowledgement by using the identity of the terminal device or the identifier of the uplink data as a scrambling code.

Optionally, when the processing unit 602 correctly decodes the uplink data, the feedback information includes an acknowledgement. The processing unit 602 first encodes the acknowledgement, and subsequently determines, based on the identity of the terminal device or the identifier of the uplink data according to a predefined rule, a location of a resource for transmitting the acknowledgement. The sending unit 603 transmits the encoded acknowledgement at the determined resource location. When the processing unit 602 incorrectly decodes the uplink data, the feedback information includes a negative acknowledgement. The processing unit 602 first encodes the negative acknowledgement, and subsequently determines, based on the identity of the terminal device or the identifier of the uplink data according to a predefined rule, a location of a resource for transmitting the negative acknowledgement. The sending unit 603 transmits the encoded negative acknowledgement at the determined resource location.

As described in the embodiment of FIG. 2, the sending unit 603 may send semi-explicit feedback information determined by the processing unit 602. When the processing unit 602 correctly decodes the uplink data, the feedback information includes an acknowledgement. The processing unit 602 first encodes the acknowledgement, and subsequently scrambles the encoded acknowledgement by using the identity of the terminal device or the identifier of the uplink data as a scrambling code. When the processing unit 602 incorrectly decodes the uplink data, the sending unit 603 does not send the feedback information.

Optionally, when the processing unit 602 correctly decodes the uplink data, the feedback information includes an acknowledgement. The processing unit 602 first encodes the acknowledgement, and subsequently determines, based on the identity of the terminal device or the identifier of the uplink data according to a predefined rule, a location of a resource for transmitting the acknowledgement. The sending unit 603 transmits the encoded acknowledgement at the determined resource location. When the processing unit 602 incorrectly decodes the uplink data, the sending unit 603 does not send the feedback information.

The information about the identifier is indirectly added to the feedback information, so that system resources occupied for transmitting the feedback information can be reduced while it is ensured that the feedback information is correctly received, thereby effectively reducing resource consumption.

As described in the embodiment of FIG. 5, the sending unit 603 may alternatively send implicit feedback information determined by the processing unit 602. When the processing unit 602 correctly decodes the uplink data, the sending unit 603 sends the identity of the terminal device or the identifier of the uplink data. When the processing unit 602 incorrectly decodes the uplink data, the sending unit 603 does not send the feedback information. In this way, a logic error in information feedback and caused by conflicting transmission can be avoided while fewer downlink resources are occupied.

Optionally, the sending unit 603 is further configured to send the feedback information by using a downlink control channel or a downlink data channel.

Optionally, the sending unit 603 is further configured to send indication information of the feedback information. The indication information includes information indicating a downlink resource used for transmitting the feedback information. The sending unit 603 sends the indication information to the terminal device by using the downlink control channel.

Other implementable functions that are of the foregoing units and that are not described in detail are the same as the related functions in the communication method shown in FIG. 2 to FIG. 5, and details are not described herein again. Cooperation between the units can enable the base station to send the correct feedback information of the uplink data, thereby effectively avoiding a logic error in information feedback and caused by conflicting transmission.

Figure 7:
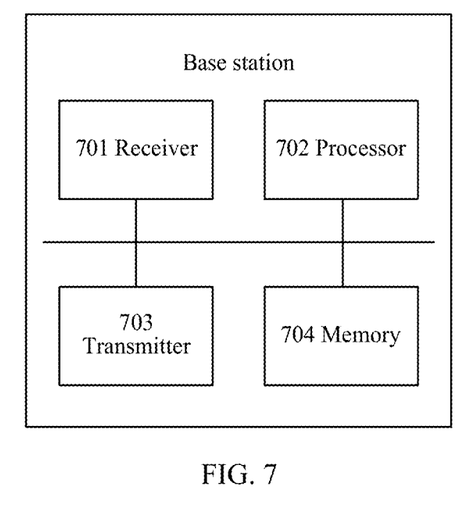
FIG. 7 is a possible schematic structural diagram of a base station according to another embodiment of the present disclosure.

FIG. 7 is a possible schematic structural diagram of the base station in the foregoing embodiments. The base station includes a receiver 701, a processor 702, and a transmitter 703. The processing unit 602 described in FIG. 6 may be implemented by using the processor 702. The receiving unit 601 and the sending unit 603 may be implemented by using the receiver 701 and the transmitter 703. The receiver 701 and the transmitter 703 may be configured to support data sending and receiving between the base station and the terminal device in the foregoing embodiments. The base station may further include a memory 704 that may be configured to store program code and data of the base station. Components of the base station are coupled together to support functions of the base station in the communication method in the embodiments described in FIG. 2 to FIG. 5.

It may be understood that FIG. 7 shows merely a simplified design of the base station. In actual applications, the base station may include any quantity of transmitters, receivers, processors, memories, and the like, and all base stations that can implement the present disclosure fall within the protection scope of the present disclosure.

Figure 8:
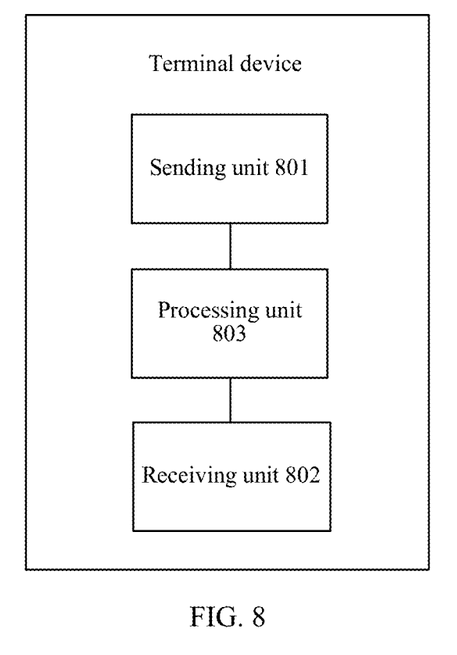
FIG. 8 is a possible schematic structural diagram of a terminal device according to an embodiment of the present disclosure.

FIG. 8 is a possible schematic structural diagram of the terminal device in the foregoing embodiments. The terminal device may be one of the terminal devices 20 and 21 shown in FIG. 1. The terminal device includes a sending unit 801, a receiving unit 802, and a processing unit 803.

The sending unit 801 is configured to send uplink data to a base station.

The receiving unit 802 is configured to receive feedback information sent by the base station. The feedback information carries information about an identifier, and the identifier includes an identity of the terminal device or an identifier of the uplink data.

The processing unit 803 is configured to determine, based on the feedback information, a status of decoding of the uplink data performed by the base station.

Optionally, the receiving unit 802 is further configured to receive the feedback information that is sent by the base station by using a downlink control channel or a downlink data channel.

Optionally, the receiving unit 802 is further configured to receive indication information of the feedback information that is sent by the base station by using the downlink control channel. The indication information includes information indicating a downlink resource used for transmitting the feedback information.

Optionally, the processing unit 803 is further configured to determine, based on the indication information of the feedback information, a location of a downlink resource for receiving the feedback information, and a coding and modulation scheme of the feedback information.

Optionally, the processing unit 803 is further configured to determine, based on the feedback information, whether the base station correctly decodes the uplink data.

As described in FIG. 2, the information about the identifier may be directly or indirectly carried in the feedback information. The feedback information may further include acknowledgement information.

The processing unit 803 may be configured to read the identity of the terminal device or the identifier of the uplink data from the feedback information.

The processing unit 803 may further be configured to descramble the feedback information by using the identity of the terminal device or the identifier of the uplink data, to obtain the acknowledgement information.

The processing unit 803 may further be configured to determine, based on the identity of the terminal device or the identifier of the uplink data according to a predefined rule, a location of a resource for receiving the acknowledgement information by the receiving unit 802.

Optionally, the processing unit 803 is further configured to determine, based on the explicit feedback information in the method described in the embodiment of FIG. 2, whether the base station correctly decodes the uplink data. For example, when the feedback information includes the identity of the terminal device and an acknowledgement (ACK), or the identifier of the uplink data and the acknowledgement (ACK), the processing unit 803 determines that the base station correctly decodes the uplink data. When the feedback information includes the identity of the terminal device and a negative acknowledgement (NACK), or the identifier of the uplink data and the negative acknowledgement (NACK), the processing unit 803 determines that the base station incorrectly decodes the uplink data.

Optionally, the processing unit 803 is further configured to determine, based on the semi-explicit feedback information in the method described in the embodiment of FIG. 2, whether the base station correctly decodes the uplink data. For example, when the feedback information includes the identity of the terminal device and an acknowledgement (ACK), or the identifier of the uplink data and the acknowledgement (ACK), the processing unit 803 determines that the base station correctly decodes the uplink data. When the feedback information includes the identity of the terminal device or the identifier of the uplink data, the processing unit 803 determines that the base station incorrectly decodes the uplink data.

Optionally, the processing unit 803 is further configured to determine, based on the implicit feedback information in the method described in the embodiment of FIG. 5, whether the base station correctly decodes the uplink data. For example, when the feedback information includes the identity of the terminal device or the identifier of the uplink data, the processing unit 803 determines that the base station correctly decodes the uplink data. When the receiving unit 802 does not receive the feedback information, the processing unit 803 determines that the base station incorrectly decodes the uplink data.

Other implementable functions that are of the foregoing units and that are not described in detail are the same as the related functions in the communication method shown in FIG. 2 to FIG. 5, and details are not described herein again. Cooperation between the units can enable the terminal device to receive the correct feedback information of the uplink data, thereby effectively avoiding a logic error in information feedback and caused by conflicting transmission.

Figure 9:
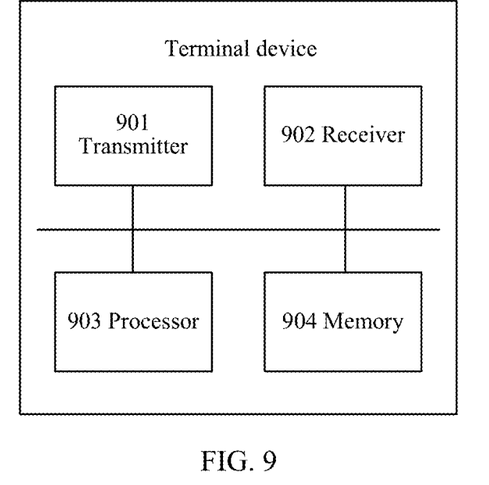
FIG. 9 is a possible schematic structural diagram of a terminal device according to another embodiment of the present disclosure.

FIG. 9 is a possible schematic structural diagram of the terminal device in the foregoing embodiments. The terminal device includes a transmitter 901, a receiver 902, and a processor 903. The sending unit 801 and the receiving unit 802 described in FIG. 8 may be implemented by using the transmitter 901 and the receiver 902. The transmitter 901 and the receiver 902 may be configured to support data sending and receiving between the terminal device and the base station in the foregoing embodiments. The processing unit 803 may be implemented by using the processor 903. The terminal device may further include a memory 904 that may be configured to store program code and data of the terminal device. Components of the terminal device are coupled together to support functions of the terminal device in the communication method in the embodiments described in FIG. 2 to FIG. 5.

It may be understood that FIG. 9 shows merely a simplified design of the terminal device. In actual applications, the terminal device may include any quantity of transmitters, receivers, processors, memories, and the like, and all terminal devices that can implement the present disclosure fall within the protection scope of the present disclosure.

It may be understood that, the processor in the embodiments of the present disclosure may be a central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. It may implement or execute various examples of logical blocks, modules, and circuits that are described with reference to the content disclosed in the present disclosure. The processor may also be a combination of computing functions, for example, a combination of one or more microprocessors or a combination of a DSP and a microprocessor.

Steps of the methods or algorithms described in the embodiments of the present disclosure may be directly embedded into hardware, a software module executed by a processing unit, or a combination thereof. The software module may be stored in a RAM memory, a flash memory, a ROM memory, an EPROM memory, an EEPROM memory, a register, a hard disk, a removable magnetic disk, a CD-ROM, or a storage medium of any other form in the art. For example, the storage medium may connect to the processing unit, so that the processing unit may read information from the storage medium and write information to the storage medium. Optionally, the storage medium may further be integrated into the processing unit. The processing unit and the storage medium may be arranged in an ASIC, and the ASIC may be arranged in a user terminal device. Optionally, the processing unit and the storage medium may be arranged in different components of the user terminal device.

A person of skill in the art should be aware that in one or more of the foregoing examples, the functions described in the embodiments of the present disclosure may be implemented by using hardware, software, firmware, or any combination thereof. If implemented in the software, the functions may be stored on a computer-readable medium, or may be transmitted on the computer-readable medium in a form of one or more instructions or code. The computer-readable medium includes a computer storage medium and a communication medium enabling the computer program to transfer from one place to another place. The storage medium may be an available medium that may be accessed by any general or special computer. For example, such a computer-readable medium may include but is not limited to a RAM, a ROM, an EEPROM, a CD-ROM, or another optical disc storage, a disk storage or another magnetic storage apparatus, or any other medium that can be used to carry or store program code, where the program code is in a form of an instruction or a data structure or in a form that can be read by a general/special computer or a general/special processing unit. In addition, any connection may be appropriately defined as a computer-readable medium. For example, if software is transmitted from a website, a server, or another remote resource by using a coaxial cable, an optical fiber computer, a twisted pair, a digital subscriber line (DSL) or in a wireless manner, such as infrared, radio, or microwave, the software is included in a defined computer-readable medium. The disk and the disc include a compressed disk, a laser disk, an optical disc, a DVD, a floppy disk, and a Blu-ray disc. The disc usually copies data by a magnetic means, and the disk usually copies data optically by a laser means. The foregoing combination may also be included in the computer-readable medium.

The objectives, technical solutions, and beneficial effects of the present disclosure are further described in detail in the foregoing specific embodiments. It should be understood that the foregoing descriptions are merely specific embodiments of the present disclosure, but are not intended to limit the protection scope of the present disclosure. Any modification, equivalent replacement, or improvement made based on the technical solutions of the present disclosure shall fall within the protection scope of the present disclosure.

What is claimed is:

1. A method, comprising:
   receiving, by a base station, uplink data sent by a terminal device;
   decoding, by the base station, the uplink data;
   determining, by the base station, based on an identity of the terminal device, a downlink resource used for transmitting feedback information of the uplink data; and
   in response to the base station correctly decoding the uplink data, sending, by the base station, using the downlink resource, the feedback information of the uplink data indicating a decoding status of the uplink data, wherein the feedback information carries information about a first identifier, and the first identifier comprises the identity of the terminal device or an identifier of the uplink data.

2. The method according to claim 1, wherein the feedback information is scrambled using the first identifier, or the feedback information comprises the first identifier.

3. The method according to claim 1, wherein the base station correctly decodes the uplink data, and the feedback information comprises an acknowledgement (ACK).

4. The method according to claim 1, wherein before sending, by the base station, the feedback information of the uplink data, the method further comprises:
 determining, by the base station, whether the uplink data has been correctly decoded.

5. The method according to claim 1, further comprising:
 in response to the base station incorrectly decoding the uplink data, not sending, by the base station, any feedback information of the uplink data.

6. The method according to claim 1, wherein sending, by the base station, the feedback information of the uplink data comprises:
 sending, by the base station, the feedback information using a downlink control channel or a downlink data channel.

7. The method according to claim 1, wherein before sending, by the base station, the feedback information of the uplink data, the method further comprises:
 sending, by the base station, indication information of the feedback information indicating the downlink resource used for transmitting the feedback information.

8. A base station, comprising:
 a receiver, configured to receive uplink data sent by a terminal device;
 a processor; and
 a non-transitory computer-readable storage medium storing a program to be executed by the processor, the program including instructions for:
  decoding the uplink data; and
  determining, based on an identity of the terminal device, a downlink resource used for transmitting feedback information of the uplink data; and
 a transmitter, configured to:
  in response to the uplink data being correctly decoded, send, using the downlink resource, the feedback information of the uplink data indicating a decoding status of the uplink data, wherein the feedback information carries information about a first identifier, and the first identifier comprises the identity of the terminal device or an identifier of the uplink data.

9. The base station according to claim 8, wherein the program further includes instructions for:
 scrambling the feedback information using the first identifier; or
 sending the feedback information including the first identifier.

10. The base station according to claim 8, wherein the uplink data is correctly decoded, and the feedback information comprises an acknowledgement (ACK).

11. The base station according to claim 8, wherein the program further includes instructions for:
 before the feedback information of the uplink data is sent, determining whether the uplink data is correctly decoded.

12. The base station according to claim 8, wherein the transmitter is further configured to:
 when the uplink data is incorrectly decoded, not send any feedback information of the uplink data.

13. The base station according to claim 8, wherein the transmitter is configured to send the feedback information of the uplink data using a downlink control channel or a downlink data channel.

14. The base station according to claim 8, wherein the transmitter is configured to:
 before sending the feedback information of the uplink data, send indication information of the feedback information indicating the downlink resource for transmitting the feedback information.

15. A terminal device, comprising:
 a transmitter, configured to send uplink data to a base station;
 a receiver, configured to receive, using a downlink resource, feedback information of the uplink data, wherein the feedback information carries information about a first identifier, the first identifier comprises an identity of the terminal device or an identifier of the uplink data, and the downlink resource has been determined based on the identity of the terminal device;
 a processor; and
 a non-transitory computer-readable storage medium storing a program to be executed by the processor, the program including instructions for:
  determining, based on the feedback information, a status of decoding of the uplink data performed by the base station.

16. The terminal device according to claim 15, wherein:
 the feedback information is scrambled using the first identifier; and
 the instructions for determining, based on the feedback information, the status of decoding of the uplink data performed by the base station, comprise instructions for:
  descrambling the feedback information using the first identifier;
  in response to the descrambled feedback information comprising an acknowledgement (ACK), determining that the base station has correctly decoded the uplink data; and
  in response to the descrambled feedback information comprising a negative acknowledgement (NACK), determining that the base station has incorrectly decoded the uplink data.

17. The terminal device according to claim 15, wherein:
 the feedback information carries comprises the first identifier; and
 the instructions for determining, based on the feedback information, the status of decoding of the uplink data performed by the base station, comprise instructions for:
  when the first identifier is identified, whether the base station has correctly decoded the uplink data; or
  when the first identifier is identified and the feedback information further comprises an acknowledgement (ACK), determine that the base station has correctly decoded the uplink data; or
  when the first identifier is identified and the feedback information further comprises a negative acknowledgement (NACK), determine that the base station has incorrectly decoded the uplink data.

18. The terminal device according to claim 15, wherein to receive the feedback information of the uplink data, the receiver is configured to:

receive the feedback information of the uplink data using a downlink control channel or a downlink data channel.

19. The terminal device according to claim 15, wherein:
the receiver is further configured to:
- before the receiver receives the feedback information of the uplink data, receive indication information of the feedback information indicating the downlink resource used for transmitting the feedback information; and the program further includes instructions for determining the downlink resource based on the indication information of the feedback information.

20. The terminal device according to claim 19, wherein to receive the indication information of the feedback information, the receiver is configured to:
- receive the indication information of the feedback information using a downlink control channel.

* * * * *